United States Patent [19]

Nomura

[11] Patent Number: 4,991,898
[45] Date of Patent: Feb. 12, 1991

[54] FIXING DEVICE FOR TRUNK COMPARTMENT FLOOR PLATE

[75] Inventor: Kazutoshi Nomura, Hamamatsu, Japan

[73] Assignee: Suzuki Motor Co., Hamana, Japan

[21] Appl. No.: 449,552

[22] Filed: Dec. 11, 1989

[30] Foreign Application Priority Data

Mar. 1, 1989 [JP] Japan .................... 1-23593[U]

[51] Int. Cl.$^5$ .............................................. B62D 43/00
[52] U.S. Cl. ................................. 296/37.2; 296/37.3; 248/239
[58] Field of Search .................... 296/37.2, 37.3; 248/239, 250, 221.4

[56] References Cited

U.S. PATENT DOCUMENTS

| | | | |
|---|---|---|---|
| 2,195,688 | 4/1940 | Windberger | 296/37.2 |
| 3,199,683 | 8/1965 | Graswich | 248/239 |
| 4,037,813 | 7/1977 | Loui et al. | 248/250 |
| 4,053,132 | 10/1977 | Del Pozzo | 248/250 X |
| 4,619,431 | 10/1986 | Matsui et al. | 248/221.4 X |
| 4,666,117 | 5/1987 | Taft | 248/250 X |
| 4,687,124 | 8/1987 | Mahr | 296/37.2 X |
| 4,795,116 | 1/1989 | Kohut et al. | 248/221.4 X |

FOREIGN PATENT DOCUMENTS

| | | | |
|---|---|---|---|
| 1034048 | 7/1958 | Fed. Rep. of Germany | 296/37.2 |
| 1283148 | 4/1962 | France | 248/239 |
| 1425847 | 4/1966 | France | 296/37.2 |
| 509367 | 1/1955 | Italy | 296/37.2 |
| 1540224 | 2/1979 | United Kingdom | 248/250 |

Primary Examiner—Margaret A. Focarino
Assistant Examiner—Andrew C. Pike
Attorney, Agent, or Firm—McGlew & Tuttle

[57] ABSTRACT

A fixing device arrangement for a trunk compartment floor plate includes a fixing device with a support portion for mounting and supporting a floor plate and a restriction wall portion extending upwardly from the support portion. A convex portion is provided, formed on the support portion extending upwardly from the support portion. The floor plate is provided with a bore such that the convex portion may be hooked into the bore for positioning the floor plate. A ledge portion is provided extending outwardly from the restriction wall portion. The ledge portion includes an undersurface which is inclined from an outer edge of the ledge portion downwardly to the restriction wall portion. The bore of the floor plate is formed to be larger than the convex portion to define a gap between the bore and the convex portion when the convex portion is hooked into the bore. An additional gap is provided between a top end edge of the floor plate and the restriction wall portion when the convex portion is hooked into the bore. The ledge portion acts to retain the floor plate in position and allows for a smooth engagement of the floor plate and the convex portion such that the convex portion may be hooked into the bore of the floor plate and to prevent detachment unless a forward end of the floor plate is raised upwardly.

5 Claims, 3 Drawing Sheets

FIXING DEVICE FOR TRUNK COMPARTMENT FLOOR PLATE

FIELD OF THE INVENTION AND RELATED ART STATEMENT

The present invention relates to a fixing device for a trunk compartment floor plate.

FIG. 8 and FIG. 9 illustrate a traditional fixing device for a trunk compartment floor plate.

The prior art fixing device 1 comprises a restriction wall portion 1a for restricting further insertion of a floor plate 3 of a trunk compartment 2, a support portion 1b for mounting and supporting the floor plate thereon, and a convex portion 4 which is provided on the support portion 1b and hooked in a bore 3a in the floor plate 3 for positioning the floor plate in position.

The fixing device 1 is located in place by receiving a projection 1c in a bore 5a in a vehicle frame 5, the projection 1c being defined behind the restriction wall portion 1a.

The floor plate 3 is located in place by hooking its bore 3a in the convex portion 4 of the fixing device 1 and thereby sealing a space 7 within which a spare tire 6 is accommodated.

Numeral 8 represents a trunk lid, whereas a numeral 9 represents a rear seat in FIG. 8.

The prior art fixing device 1 can support the floor plate 3 in place with its support portion 1b and also locate the floor plate 3 in position with its convex portion 4, but this arrangement is disadvantageous in that the floor plate may be detached due to vibration which a vehicle may generate while travelling along a rough road.

OBJECT AND SUMMARY OF THE INVENTION

The present invention has been made with the above state of the art as a background, and an object of the present invention is to provide a fixing device for a trunk compartment floor plate which may not be detached due to vibration of the floor plate.

According to the principle of the present invention, a fixing device for a trunk compartment floor plate is provided, said fixing device comprising a restriction wall portion for restricting the insertion of the floor plate beyond a certain point, a support portion for mounting and supporting the floor plate thereon, and an convex portion which is hooked in a bore defined in the floor plate for locating the floor plate in place. The restriction wall portion is provided with a ledge portion so that the floor plate hooked in the convex portion may not be detached unless its forward portion is raised upwardly. The ledge portion has an undersurface which is inclined and descends from a ledge end inwardly toward the fixing device. The bore formed in the floor plate is formed so as to be larger than the convex portion to provide a gap between the bore and the convex portion while the convex portion is being hooked into the bore. Another gap is provided between the top end of the floor plate and the restriction wall portion of the fixing device.

BRIEF DESCRIPTION OF THE DRAWINGS

FIG. 1 through FIG. 4 illustrate one embodiment of the fixing device for a trunk compartment floor plate according to the present invention wherein:

FIG. 1 is a perspective view illustrating the rear part of the vehicle;

FIG. 2 is a cross-sectional view taken along a line II—II in FIG. 1;

FIG. 3 is a perspective view of a fixing device shown in FIG. 2;

FIG. 4 is an enlarged cross-sectional view similar to FIG. 2, illustrating the fixing device while being attached;

FIG. 5 through FIG. 7 are views of another embodiment of the present invention wherein:

FIG. 5 is a left-hand lateral plan view of the fixing device;

FIG. 6 is a front plan view of the fixing device;

FIG. 7 is a plan view of the floor plate;

FIG. 8 and FIG. 9 are views illustrating a prior art fixing device structure for a trunk compartment floor plate wherein:

FIG. 8 is a cross-sectional view taken through a truck compartment of the prior art; and FIG. 9 is an enlarged exploded perspective view of a fixing device of the prior art.

DETAILED DESCRIPTION OF PREFERRED EMBODIMENTS

Figure 1:
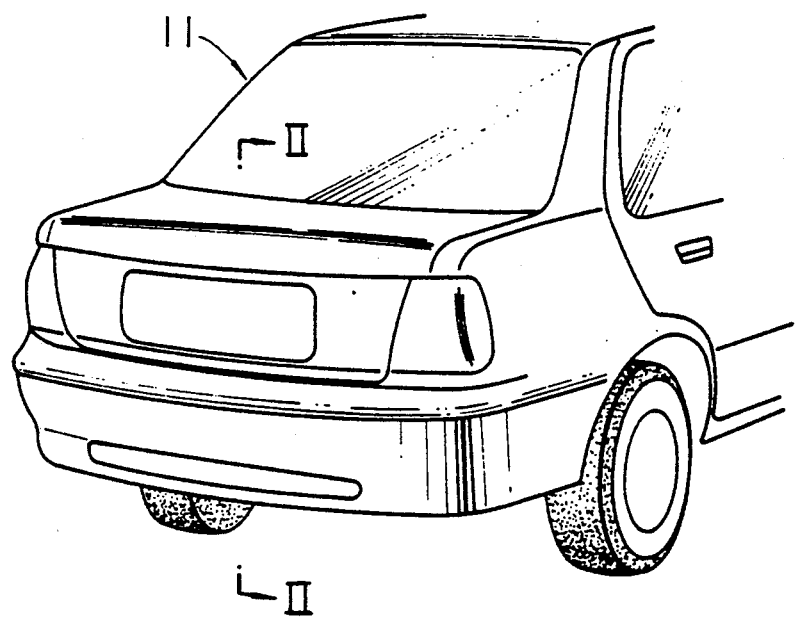

FIG. 1 through FIG. 4 illustrate one embodiment of the present invention.

A fixing device 10 in this embodiment is used to fix the floor plate 13 of the trunk compartment 12 of the vehicle, and comprises a restriction wall portion 10a for restricting a further insertion of the floor plate 13 beyond a certain point, a support portion 10b for mounting and supporting the floor plate 13 thereon, and a convex portion 14 which is hooked in a bore 13a defined in the floor plate for locating the floor plate in place, and preferably the fixing device 10 is formed integral including the wall portion 10a and the support portion 10b. Furthermore, the fixing device 10 comprises a ledge portion 15 which is provided for projecting from the restriction wall 10a at a level above the convex portion 14. Fixing means 16 is provided positioned behind the restriction wall 10a and is preferably formed integrally with restriction wall 10a.

The convex portion 14 is formed, for example, in a cylindrical configuration to correspond with the shape of the bore 13a in the floor plate 13.

The ledge portion 15 is provided to project outwardly so as to locate its top end of outer end 15a at a position more closely adjacent to the restriction wall 10a than to the convex portion 14. This arrangement may permit a user to raise the forward portion 13c of the floor plate 13 upwardly about its top end 13b while the convex portion 14 is hooked in the bore 13a in the floor plate 13.

The ledge portion 15 has an undersurface 15b (see FIG. 4) inclined to descend toward the restriction wall 10a. This arrangement enables the top end 13b of the floor plate 13 to be guided smoothly toward the restriction wall portion 10a.

The fixing means 16 has an anti-detachment pawl 16a, and by engaging the pawl 16a in a bore 17a in the frame 17, the fixing means 16 can be secured to the vehicle body frame 17. Additionally, though the fixing device 10 in this embodiment uses the anti-detachment pawl 16a as a fixing means 16, an adhesive may be used as well.

When the fixing device 10 of this embodiment is used, the top end 13b of the floor plate 13 is inserted into the restriction wall portion 10a from a slightly upward direction until the top end 13b abuts with the restriction wall portion 10a, and then the forward portion 13c is lowered downwardly to bring the convex portion 14 into engagement with the bore 13a.

Additionally, a space 19 within which a spare tire 18 is accommodated is sealed by means of the floor plate 13.

Under this condition, the floating movement of the top end 13b is restricted by means of the undersurface 15b of the ridge portion 15 even when the floor plate 13 is caused to vibrate while the vehicle 11 is travelling along a rough road, and thereby retaining the floor plate 13 in place without any chance of detachment.

Figure 2:
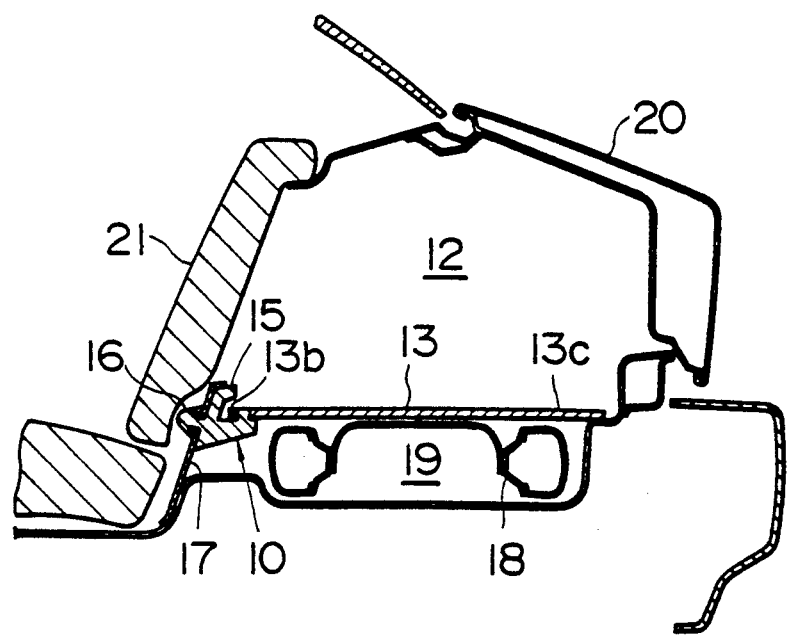
Figure 3:
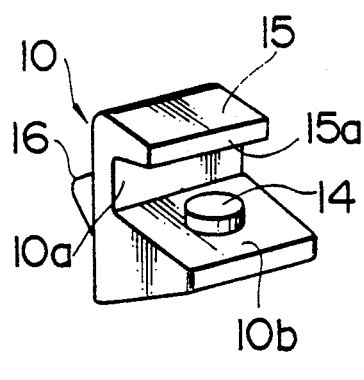
Figure 4:
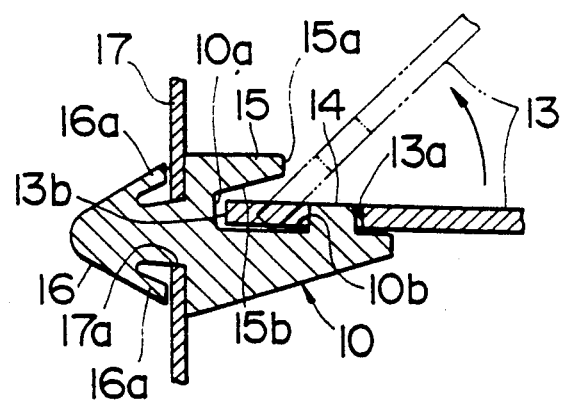

In FIG. 1 and 2, numeral 20 represents a trunk lid and numeral 21 represents a rear seat.

Figure 5:
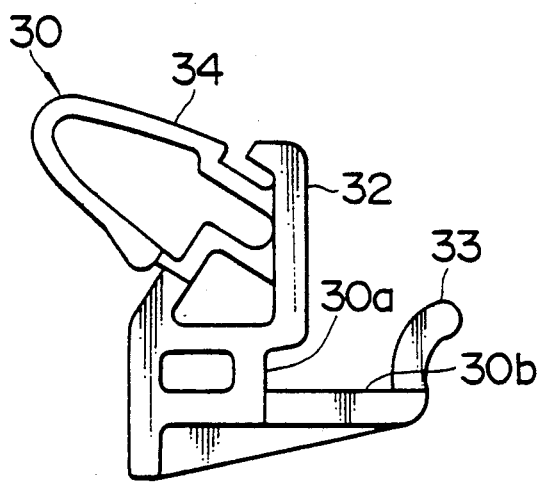
Figure 6:
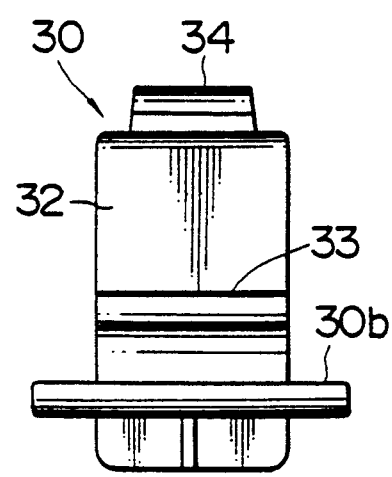
Figure 7:
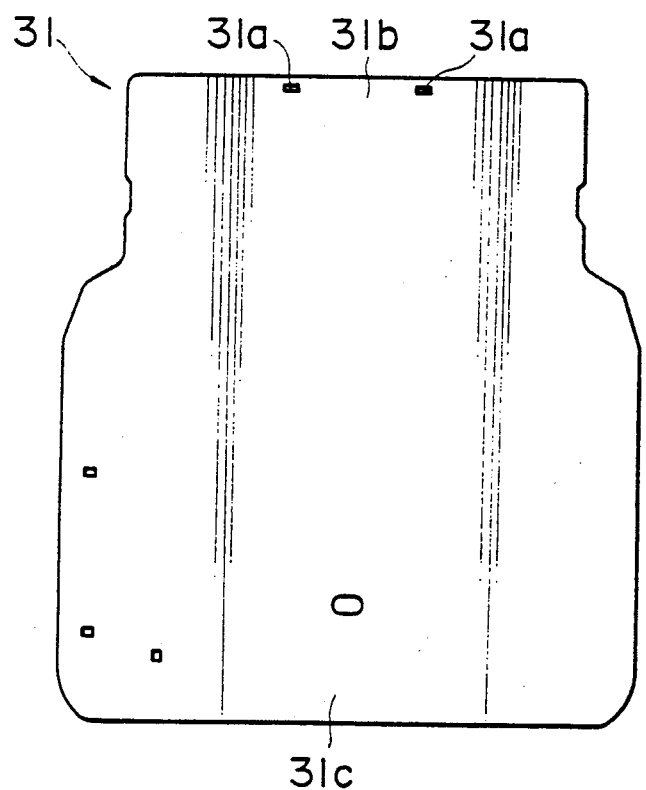
Figure 8:
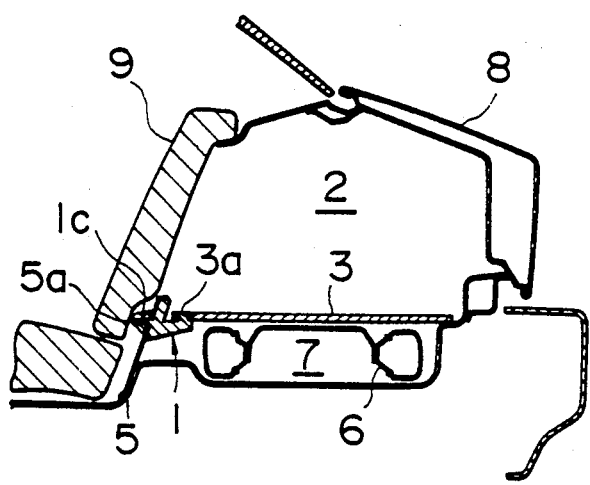
Figure 9:
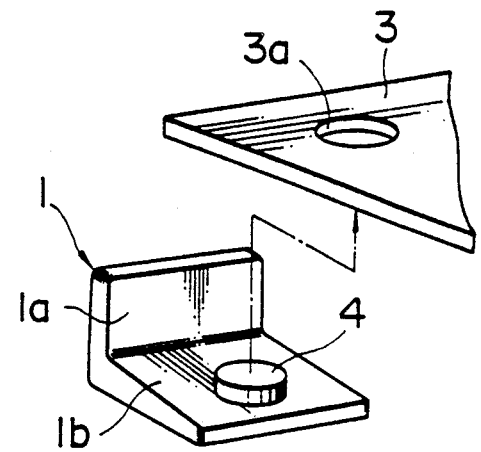

FIG. 5 through FIG. 7 illustrate another embodiment of the present invention.

In a fixing device 30 of the trunk compartment floor plate according to this embodiment, the restriction wall 30a for limiting a further insertion of the floor plate 31 is provided with a ledge portion 32 having a rather reduced height as compared to the ledge portion 15 in the previous embodiment. The support portion 30b for supporting the floor plate 31 thereon is provided with the convex portion 33 having a configuration different from that for the convex portion 14, and the fixing means 34 of the fixing device is formed on the back surface of the ledge portion 32 to orient in a slightly upward direction.

The convex portion 33 of the fixing device 30 is formed in a slightly curved and laterally elongated cross section, which formation facilitates the convex portion 33 to be easily hooked in the bore 31a in the floor plate 31.

The fixing device 30 in this embodiment operates in the same manner as in the previous embodiment, and therefore its further description is omitted.

The fixing device 10 or 30 may locate the floor plate 13 or 31 in place in a more precise and smooth manner when a plurality of such devices are used. The floor plate 31 may take the configuration as shown in FIG. 7 when two such fixing devices 30 are used. In this case, it is also possible to define two bores 31a. These two bores 31a are located substantially in a central portion of the top end 31b of the floor plate 31. Additionally, in FIG. 7, numeral 31c represents a forward portion of the floor plate 31.

As described hereinbefore, the fixing device for the trunk compartment floor plate according to the principle of the present invention can prevent the detachment of the floor plate from the fixing device when the floor plate is vibrated while the vehicle is travelling along a rough road, because the ledge portion which is provided on the restriction wall portion can restrict the floating movement of the floor plate. Furthermore, the fixing device is constructed in a simplified form and thus can be readily put into a practical application.

Moreover, because no separate retainer of a special type is used for the floor plate in the present invention, a user can attach and remove the floor plate in a speedy and an easygoing fashion.

I claim:

1. A fixing device arrangement for a vehicle trunk compartment comprising: a fixing device including a support portion defining a mounting surface, a restriction wall portion extending upwardly from said support portion, a convex portion provided on said support portion extending outwardly from said support portion, and a ledge portion extending outwardly from said restriction wall portion, wherein said ledge portion includes an undersurface inclined downwardly from an outer end to said restriction wall portion; and a floor plate defining a bore having a bore opening dimension, said convex portion being hooked into said bore for positioning said floor plate with respect to said mounting surface, said bore dimension being larger than that of said convex portion to define a gap between an interior side of said bore and said convex portion once said floor plate is positioned on said mounting surface and said convex portion is hooked into said bore, said floor plate having a dimension from said bore to a top end of said floor plate which is smaller than a distance from said convex portion to said restriction wall portion to define a gap between said top end and said restriction wall portion, thereby maintaining said floor plate with said convex portion hooked into said bore unless a forward portion of said floor plate is raised upwardly.

2. The fixing device arrangement according to claim 1, wherein said restriction wall portion, said support portion, and said ledge portion are all integrally formed.

3. The fixing device arrangement according to claim 1, wherein the restriction wall portion is provided with an anti-detachment pawl at a back surface for fixing said fixing device to a vehicle.

4. The fixing device arrangement according to claim 1, wherein said floor plate defines a space within which a spare tire is accommodated.

5. A fixing device for a trunk compartment floor plate comprising: a restriction wall portion; a support portion defining a mounting surface for supporting the floor plate thereon, said support portion being joined to said restriction wall portion such that said restriction wall portion extends outwardly therefrom; and a convex portion provided on said support portion extending outwardly from said support portion, the floor plate having a bore, said convex portion being hooked into said bore to position said floor plate on said mounting surface, said restriction wall portion including a ledge portion extending outwardly from said restriction wall portion, said ledge portion including an undersurface inclined downwardly from a ledge portion top end to said restriction wall portion, said bore being formed larger than that of said convex portion to define a gap between an interior side of said bore and said convex portion when said convex portion is hooked into said bore, the floor plate having a dimension from said bore to a top end of said floor plate which is smaller that a distance from said convex portion to said restriction wall portion to define a gap between said restriction wall portion and the top end of the floor plate when said convex portion is hooked into said bore, thereby insuring that the top end of said floor plate may be guided smoothly in a direction of said restriction wall portion for hooking said convex portion into the bore and for preventing detachment of said convex portion from said bore unless a forward portion of said floor plate is raised upwardly.

* * * * *